Jan. 24, 1961  A. BAUMANN ET AL  2,969,137
SELECTIVE DISTRIBUTING AND CONVEYOR SYSTEM
Filed Oct. 15, 1958  5 Sheets-Sheet 2

INVENTORS:
Albert Baumann
Helmut Bünten
BY

Karl F. Ross
AGENT.

Jan. 24, 1961 A. BAUMANN ET AL 2,969,137
SELECTIVE DISTRIBUTING AND CONVEYOR SYSTEM
Filed Oct. 15, 1958 5 Sheets-Sheet 3
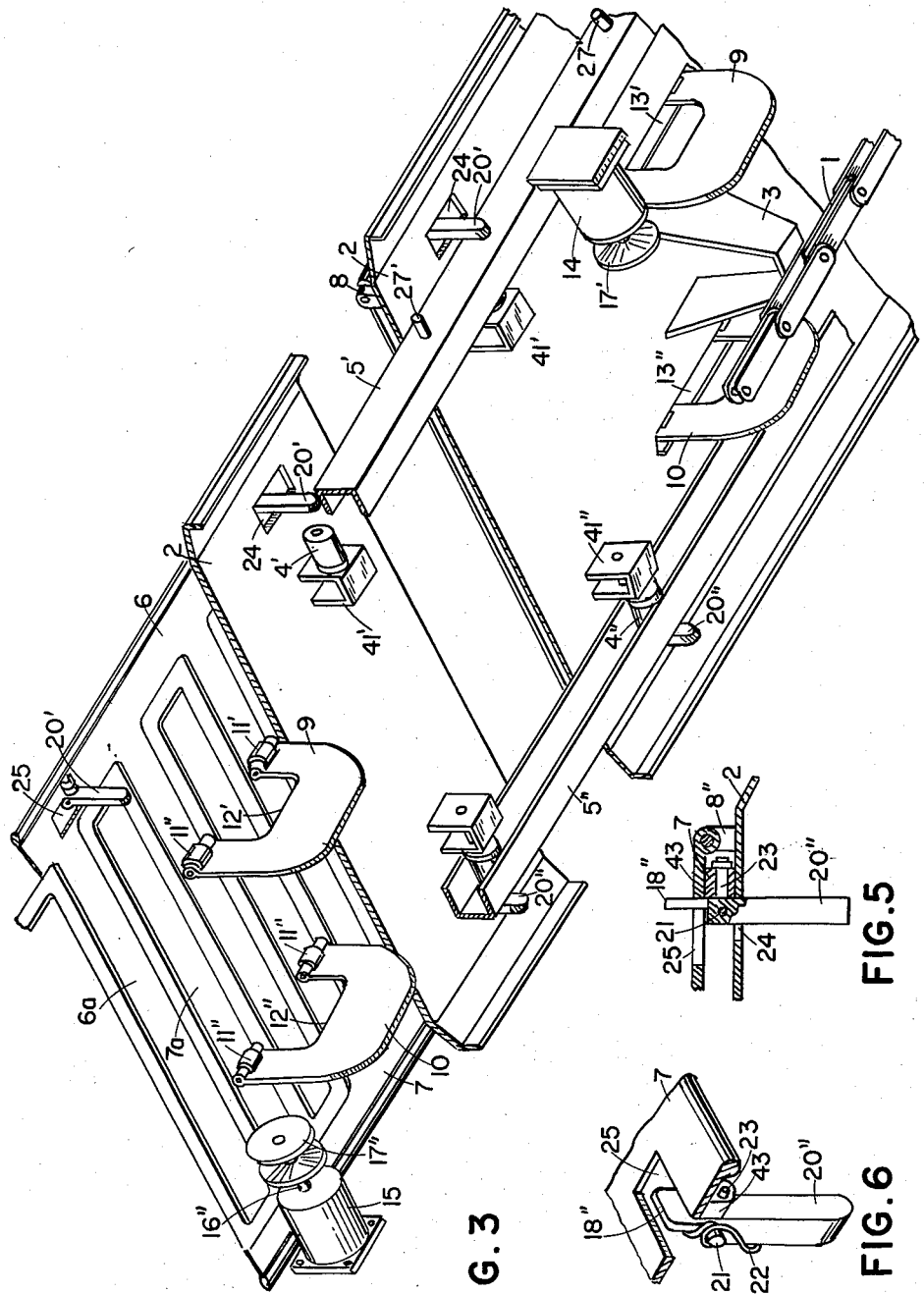
INVENTORS:
Albert Baumann
Helmut Bünten
BY
*Karl F. Ross*
AGENT.

Jan. 24, 1961  A. BAUMANN ET AL  2,969,137
SELECTIVE DISTRIBUTING AND CONVEYOR SYSTEM
Filed Oct. 15, 1958  5 Sheets-Sheet 4

INVENTORS:
Albert Baumann
Helmut Bünten

BY

AGENT.

Jan. 24, 1961 A. BAUMANN ET AL 2,969,137
SELECTIVE DISTRIBUTING AND CONVEYOR SYSTEM
Filed Oct. 15, 1958 5 Sheets-Sheet 5

INVENTORS:
Albert Baumann
BY Helmut Bünten

AGENT.

United States Patent Office 2,969,137
Patented Jan. 24, 1961

2,969,137

SELECTIVE DISTRIBUTING AND CONVEYOR SYSTEM

Albert Baumann and Helmut Bünten, Bielefeld, Germany, assignors to Durkoppwerke Aktiengesellschaft, Bielefeld, Germany, a corporation of Germany Filed Oct. 15, 1958, Ser. No. 767,463

Claims priority, application Germany Oct. 24, 1957

18 Claims. (Cl. 198—38)

Our present invention relates to a conveyor system serving a plurality of stations designed successively to receive certain objects or articles for processing, such as raw materials and unfinished goods in various stages of manufacture.

A conveyor system of this general type has been disclosed in commonly assigned U.S. patent application Ser. No. 659,501, filed May 16, 1957 by Albert Baumann (one of the present applicants). This system features an endless band on which a series of tray-shaped platforms are alternately tiltable in opposite directions, the tilting being accomplished by stationary ramps provided at a series of work stations which are located along both sides of the conveyor band to receive the conveyed articles. Even in its tilted position, however, delivery to an adjacent station of an article carried on a platform is normally prevented by a detent which can be selectively inactivated, from a control point, whenever such platform arrives at the destination of its load. Thus, a supervisor at the control point can initially route each article to a first work station for preliminary processing and, thereafter, re-route the same article to a different work station for further treatment.

With the system just described it is necessary that all articles be returned to the control point after their processing at any work station has been completed. This is inconvenient particularly in larger installations where the average distance of the work stations from the control point may greatly exceed the separation between those stations at which a given article is to be treated in succession. Moreover, the need for the intervention of a supervisor at the control point is wasteful in those instances where the distribution of all articles follows a well-established pattern and/or where the several work stations are manned by operators who are themselves capable of determining the further routing of an article just processed.

It is, therefore, an object of our present invention to provide, in a system of the type set forth, means for enabling an operator at any station to dispatch an article via the conveyor to any other station, as by actuating a selector mechanism which releases the detent of a tiltable conveyor platform as soon as the same approaches the desired station for the first time.

In a system as described above, moreover, any carrying platform can serve only those stations toward which it can be tilted so that, with the stations distributed evenly on both sides of the conveyor and the platforms alternately tiltable to the left and to the right, each station can receive deliveries from every second platform only. Since it may be convenient to route a particular article to successive stations not all located on the same side of the conveyor, it is another object of our invention to provide a carrier which is selectively tiltable in either direction to discharge its load.

With the work stations positioned close to one another to conserve space, the use of stationary ramps for the indiscriminate tilting of each carrier at every station, selected or unselected, becomes impractical especially if such tilting is to occur alternately in two directions. Also, the undulations of the carriers may be distracting to the personnel and misleading in that the operator at a particular station will have no advance indication whether an oncoming carrier is about to make a delivery at such station. It is, therefore, a further object of this invention to provide means selectively operable to cause the tilting of a carrier at any work station, advantageously in combination with detent means adapted to be automatically inactivated by such tilting operation.

In accordance with a feature of this invention we provide each carrier of a conveyor with a pair of interleaved supporting grids respectively tiltable in opposite directions, each of these grids being preferably of comb-like or crenellated configuration and provided with hinge means pivotally connecting the ridge of its comb with the conveyor-supported carrier body. With a box or similar article positioned upon the carrier, a selective tilting of one or the other grid about its hinge or hinges will cause such article to be dislodged and delivered toward a receiving station on the right or the left of the conveyor, respectively.

Another feature or our invention resides in the provision of a preferably depending ramp on each carrier, in combination with a normally retracted controller at each station selectively positionable in the path of the ramp of an oncoming carrier for camming engagement therewith so as to cause a tilting of its supporting platform for the purpose of releasing an article carried thereon. Where the platform consists of two independently swingable grids with interleaved fingers, as described above, two ramps must be provided of which each advantageously is in the form of a generally U-shaped bracket depending from two fingers of one grid in such manner as to accommodate one or more of the fingers of the other grid. The operative positioning of any controller is advantageously accomplished, in accordance with a further feature of the invention, by means of an electromagnet whose actuating circuit includes one or more contacts adapted to be closed under the control of a selector mechanism provided on each carrier.

As the tilting of a supporting surface by a camming mechanism is inherently a gradual process, it is generally necessary to start the swinging movement at some point ahead of the location where it is desired to receive the delivered articles. Depending upon the weight, bulk and roughness of these articles, however, they may begin to slide off the support at various angles of elevation so that each work station would have to be provided with a rather wide receiving surface to accomomdate a certain scattering range. It is for this reason that we prefer to provide each carrier with means for inactivating a detent on the tilted supporting surface at a predetermined location within the operating zone of the camming mechanism of each station, i.e. at a point where this surface has reached its maximum angle of elevation.

The above and other objects, features and advantages of our invention will become more fully apparent from the following detailed description, reference being had to the accompanying drawing in which:

Fig. 3 is a perspective bottom view of part of the system of Figs. 1 and 2;

Fig. 5 is a perspective view of a detail of the detent mechanism forming part of the system of Figs. 1–4;

Fig. 6 is an elevational view, partly in section, of the elements shown in Fig. 5;

Figure 1:
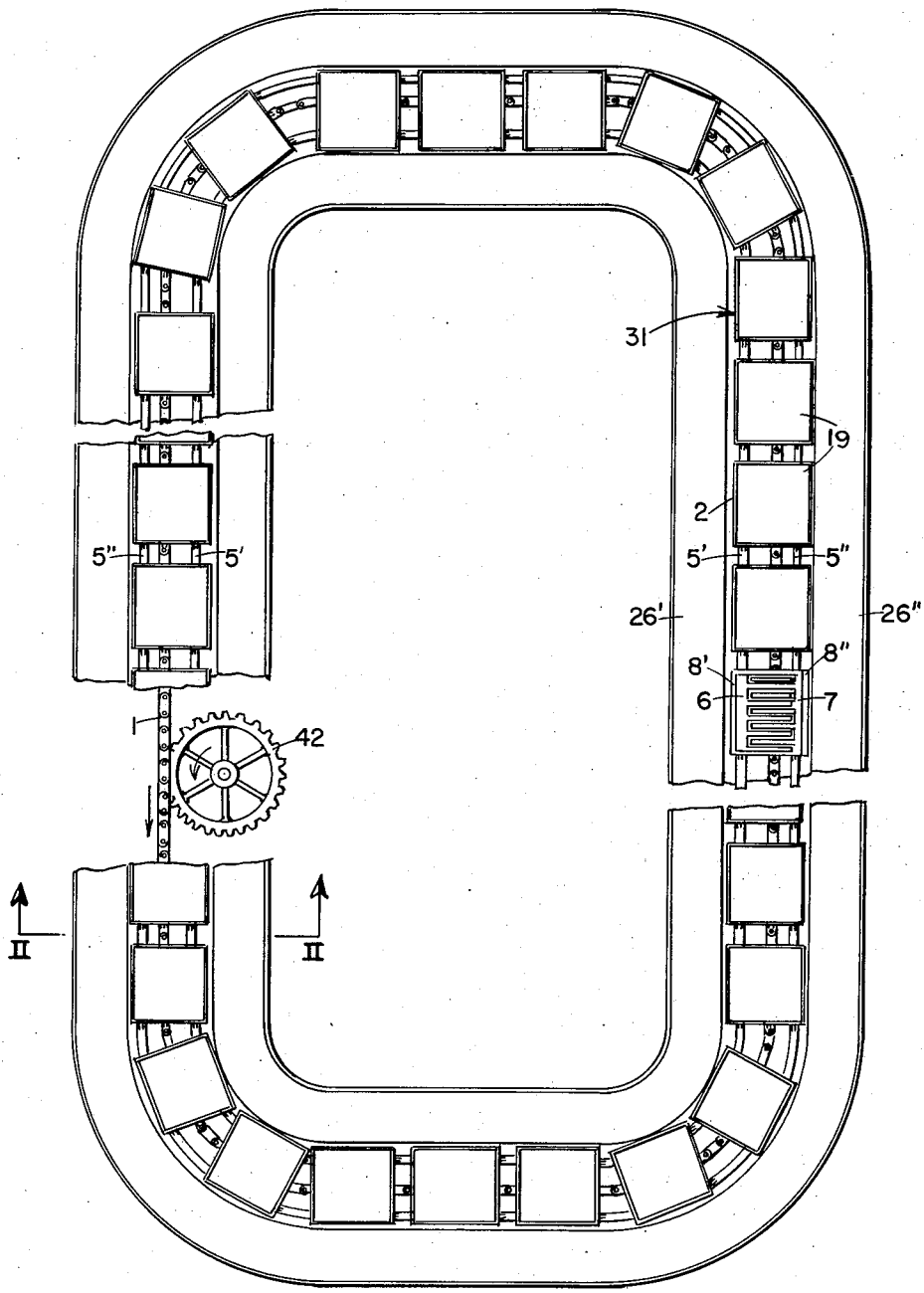
Fig. 1 is a top plan view of a conveyor system embodying the invention, showing the overall organization of such system.
Figure 4:
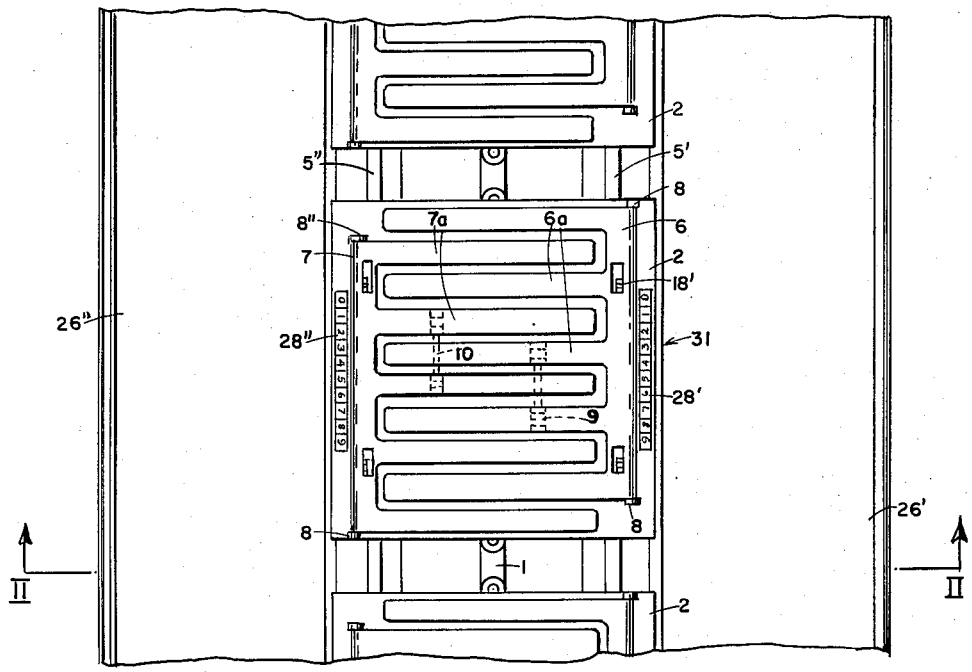
Fig. 4 is a fragmentary top plan view of the system, drawn to the same scale as Fig. 2.

The system illustrated in Figs. 1–6 comprises a frame 40 sustaining two rails 5', 5" which are disposed in two closed, concentric horizontal loops. Rollers 4' and 4", respectively engaging the rails 5' and 5", are mounted on brackets 41', 41" which depend from the underside of a series of supporting plates 2 forming part of respective carriers 31. Also depending from each carrier plate is a central bracket 3 which is linked with an endless chain 1 disposed midway between and somewhat below the rails 5', 5". The chain 1 co-operates with one or more sprockets 42 of which some or all may be driven by a motor M to impart to it, and thus to the carriers 2, a continuous movement in a desired sense (e.g. counter-clockwise in Fig. 1 as indicated by the arrow).

Swingably connected with each carrier plate 2 are a pair of grids 6, 7 whose hinges 8', 8" are respectively located near opposite longitudinal edges of the carrier plate. These grids are generally comb-shaped and provided with interleaved fingers 6a, 7a extending across the greater part of the carrier surface. Secured by hinges 11' to a pair of adjacent fingers 6a is a U-shaped bracket 9 which passes through a slot 13' in plate 2 and forms a depending ramp adapted to be cammed upwardly by a roller 17' carried on the armature 16' of a stationary electromagnet or solenoid 14. Similarly, a ramp member 10 is hinged at 11" to a pair of fingers 7a and passes through a slot 13" of plate 2 of carrier 31 for camming engagement with a roller 17" carried on the armature 16" of a stationary electromagnet or solenoid 15. It will be noted that the clearances 12', 12" existing between the legs of the U of each ramp 9, 10 are large enough to accommodate the fingers of the respectively opposite grids so that an upward movement of ramp 9, for example, will raise the grid 6 into tilted position without affecting the positioning of grid 7.

Normally, i.e. in the unexcited conditions of electromagnets 14 and 15, the rollers 17', 17" are withdrawn from the path of the associated ramps 9 and 10, respectively. When one of the magnets is energized, as shown for the magnet 15 illustrated in Fig. 3, its roller (here 17") assumes a position adapted for camming engagement with the suitably rounded-off outer edge of the oncoming ramp 10 so as to lift the latter into grid-tilting position. As the roller is deeply grooved, the ramp will remain engaged by it until moved out of its reach by the advance of chain 1, even if the magnet is de-energized in the interim.

Figure 2:
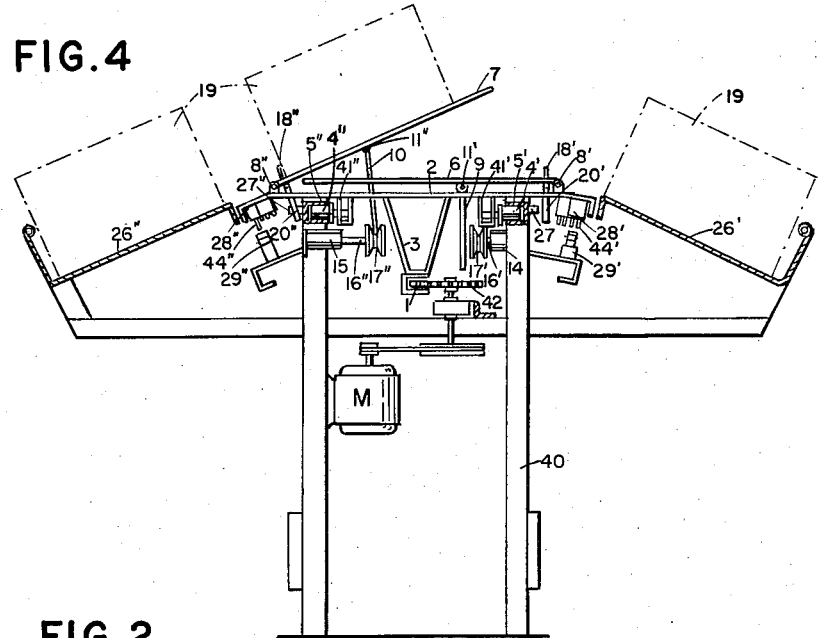
Fig. 2 is a cross-sectional elevational view taken on line II—II of Fig. 1, drawn to a larger scale.
Figure 7:
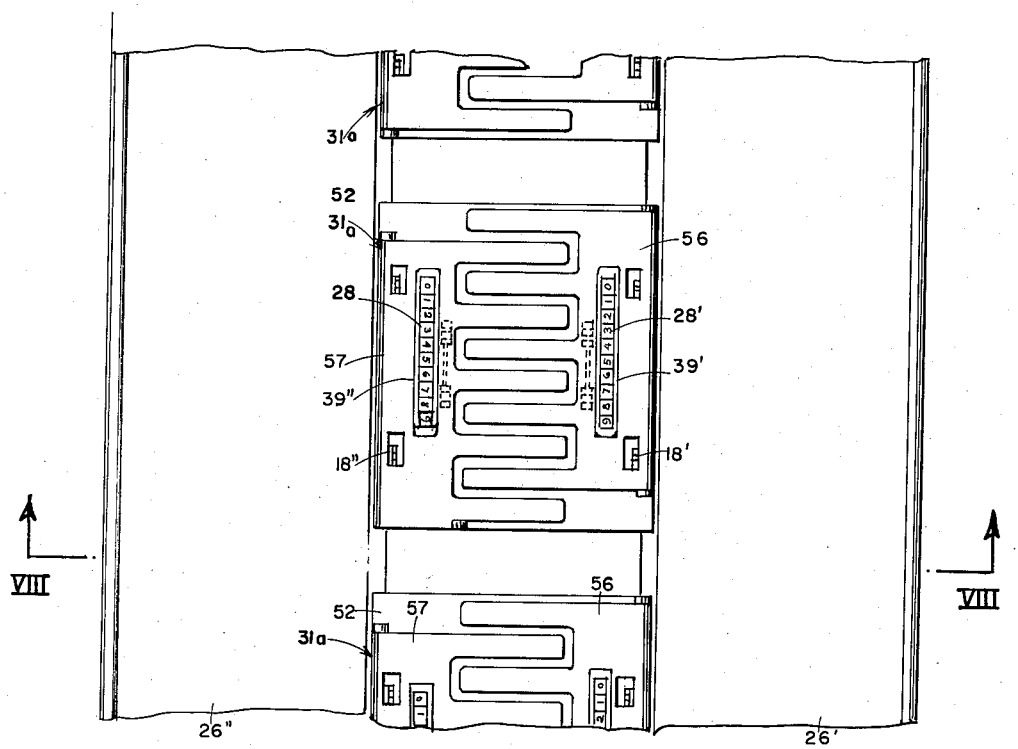
Fig. 7 is a top plan view of part of a modified conveyor system according to the invention.

Each supporting grid 6, 7 is provided with a pair of longitudinally spaced detents, numbered 18' in the case of grid 6 and 18" in the case of grid 7, which are in the form of upstanding brackets pivotally linked with depending levers 20', 20", respectively, by means of pins generally designated 21 (Figs. 5 and 6). A pin 23, lodged in a lug 43 on the underside of the corresponding grid, enables the lever 20' or 20" with its rider 18' or 18" to be swung, within clearances 24, 25 respectively provided in plate 2 and in grid 6 or 7, in a plane extending parallel to the direction of movement of the conveyor 1, 31. A spring 22 engages each detent 18', 18" in such manner as to tend to maintain it perpendicular to its grid 6 or 7, thus in contact with the outer lateral edge of the corresponding window 25; the detent is, accordingly, adapted to yield in an inward direction to an article 19, such as a square box containing garments or the like, which is being pushed onto the carrier grid 6 or 7 from an inclined receiving surface 26' or 26" of an adjoining work station. The longitudinal oscillatory mobility of each unit 18', 20' or 18", 20", on the other hand, enables the retraction of the detent within window 25 under the control of a peg 27' or 27" which lies in the path of lever 20' or 20" when, and only when, the corresponding grid is elevated into its tilted position as illustrated in Fig. 2 for the grid 7.

The energization of the magnets 14 and 15 is controlled by stationary contacts 29', 29" which occupy different positions at successive work stations and are adapted to be closed by respective pins 44', 44" entrained by the carrier plates 2. These pins are normally retracted and can be individually extended into operative positions by a selector mechanism operable to determine the destination of each carrier. Inasmuch as the system here shown serves a series of work stations on both sides of the conveyor path, it is convenient to duplicate this mechanism on opposite sides of each carrier, as by providing two sets of push buttons 28', 28" connected in parallel for the selective actuation of any pin 44', 44". The push buttons of each selector, numbered from "1" to "9" and "0," are advantageously provided with means known per se for restoring a previously depressed button upon the actuation of another and, at the same time, canceling the preceding selection; the "0" button may be used for cancellation only, without extending any of the pins. In larger plants it will, of course, be possible to use two or more rows of buttons on each selector, the magnets being then operable by combinations of contacts 29' or 29" rather than by individual contacts alone.

It will be understood that the selector mechanism illustrated is representative of a large variety of conventional devices of this character and that the invention is not restricted to the use of push buttons or the like.

As best seen in Fig. 3, the magnets 14, 15 (and, with them, the work stations) are staggered on opposite sides of the conveyor system so that no simultaneous raising of both grids 6, 7 of a carrier can occur; thus there is no danger of any crushing of a conveyed article 19 between these grids upon a faulty operation of the selector mechanism. The pegs 27', 27" are so positioned on rails 5', 5" that two of them will simultaneously engage the two levers 20' or 20" of a grid 6 or 7 an instant after the same has been fully elevated by the operation of an associated magnet 14 or 15, respectively. The ensuing retraction of the corresponding detents 18' or 18" allows the article 19 on the raised grid to slide onto the adjacent receiving surface 26' or 26"; thereupon the operator at the work station represented by this receiving surface may push another article 19 upon the carrier and simultaneously actuate the adjacent selector 28' or 28" to indicate the destination thereof, or the carrier may proceed unloaded to a further station where another operator will perform these steps. It will be apparent that the yieldable mounting of the spring-loaded detents 18', 18" will enable the loading of a carrier in both the elevated and the horizontal positions of its grids.

The embodiment of Figs. 7–10 represents a conveyor system generally similar to that of the co-pending Baumann application, this system utilizing two endless chains 30', 30" which lie in parallel vertical planes and are slung at each end around respective sprocket wheels 50', 50". The chains support a series of carriers 31a which are pivotally connected thereto by respective dowels 51', 51" whose spacing x in the direction of travel corresponds to the radial distance between the two sprocket hubs. By virtue of this arrangement, as more fully explained in the co-pending application, each carrier 31a is maintained horizontal as it passes around the sprockets at each end of its looped path.

The carriers 31a resemble those of the preceding embodiment, except that their grids 56, 57 are linked to the carrier plates 52 at the very edges of the latter and are provided with windows 39', 39" through which the selectors 28', 28" can be reached. Centrally mounted on a cross-beam 38 at each of the oppositely located work stations, whose receiving surfaces have again been indicated at 26', 26", is a respective electromagnet or solenoid 32 or 33 whose armature carries a roller 36 or 37 adapted to co-operate, in the previously described manner, with a ramp member 34 or 35 depending from the associated carrier grid. The remaining elements of the tilting and releasing mechanism, including detents 18', 18" and contacts 29', 29", are analogous to those of the system of Figs. 1–6 and their operation requires no further description.

Figure 8:
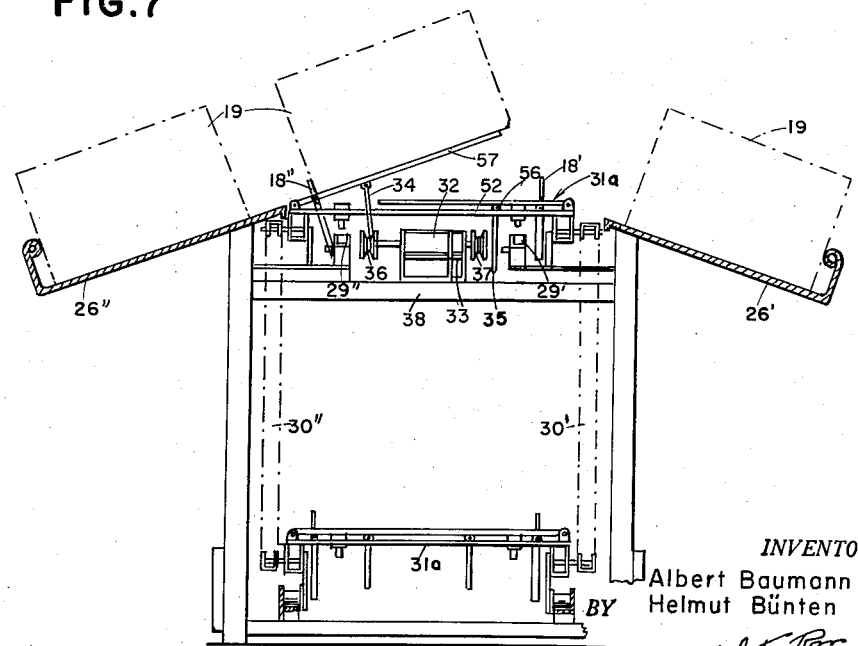
Fig. 8 is a cross-sectional view similar to Fig. 2, taken on the line VIII—VIII of Fig. 7.
Figure 9:
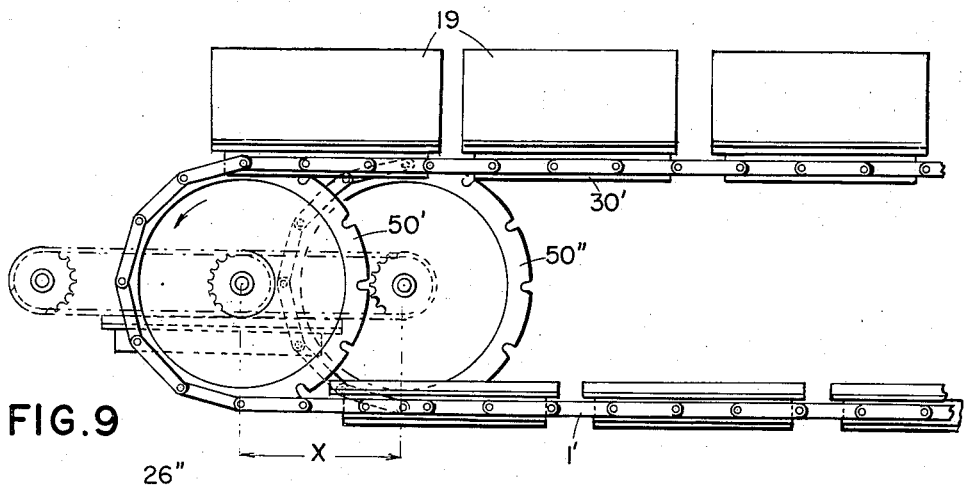
Fig. 9 is a side-elevational view of a portion of the system of Figs. 7 and 8.
Figure 10:
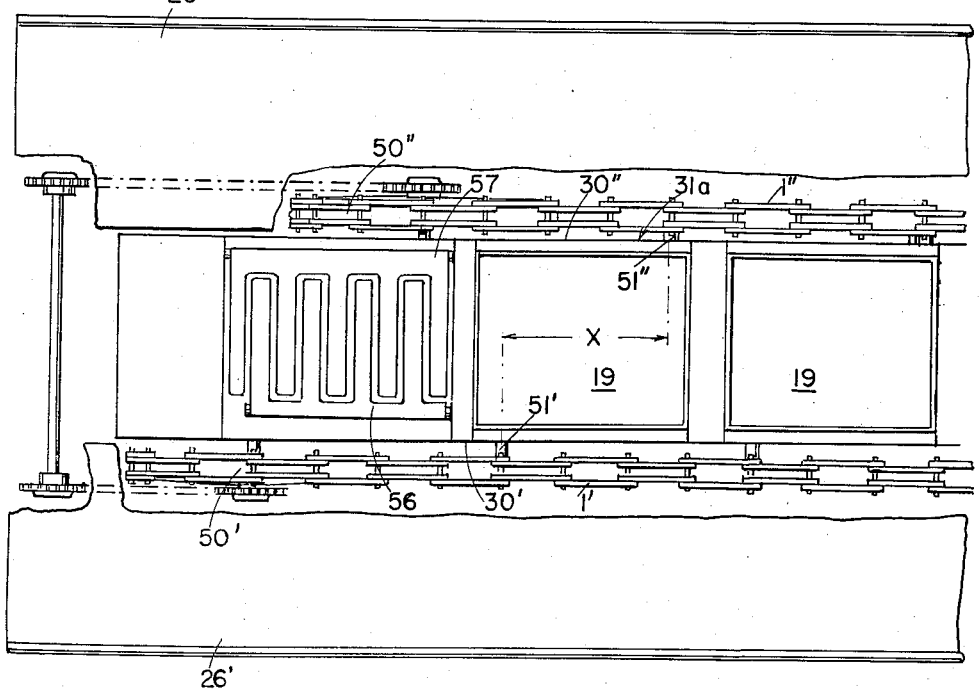
Fig. 10 is an overall top plan view of the system shown in Figs. 7–9.

With the system of Figs. 7–10 it may be convenient to provide the work stations with inclined receiving surfaces 26', 26" only along the upper run of the conveyor band, as illustrated in Fig. 8, the lower run being then used only for the loading of the articles 19 onto the carriers. It will be apparent, on the other hand, that these receiving surfaces together with the associated solenoids 32, 33, rollers 36, 37 and contacts 29", 29' could also be duplicated along both the upper and the lower run of the conveyor.

Our invention is, of course, not restricted to the specific embodiments described and illustrated but may be realized in numerous modifications and adaptations without departing from the spirit and scope of the appended claims.

We claim:

1. A carrier for articles to be selectively delivered to a plurality of stations located at opposite sides of a conveyor path, comprising a carrier body, a pair of oppositely tiltable grids with interleaved formations swingably secured to said carrier body, and mechanism for selectively tilting either of said grids from a normal horizontal into an off-normal inclined position.

2. A carrier according to claim 1 wherein each of said grids is comb-shaped and provided with hinge means securing the ridge of its comb to said carrier body.

3. A carrier according to claim 1 wherein said mechanism includes a depending ramp member on each of said grids.

4. A carrier according to claim 3 wherein each of said grids is provided with a plurality of substantially parallel fingers alternating with the fingers of the other grid, said ramp member comprising a generally U-shaped bracket secured to a pair of fingers of one grid and clearing the intervening part of the other grid in the tilted position of said one grid.

5. A carrier according to claim 4 wherein said bracket is swingably mounted on said pair of fingers for movement about a pivotal axis parallel to those of said grids.

6. A carrier according to claim 3 wherein said carrier body is a plate having a slot traversed by said ramp member.

7. A carrier according to claim 1 wherein each of said grids is provided with retractable detent means normally projecting from its upper surface adjacent a lateral edge thereof for preventing the sliding of an article off said upper surface in the tilted position of said grid.

8. A carrier according to claim 7 wherein said detent means comprises a lever swingably depending from the grid for movement in a plane parallel to said edge, said lever having an upwardly projecting extension retractable below said surface by such movement.

9. A carrier according to claim 8 wherein said extension is swingable on said lever in a plane transverse to said parallel plane and is provided with spring means urging it toward said edge with freedom of yielding to an article pushed across said edge onto said grid.

10. In a conveyor system, in combination, an endless band, a series of carriers on said band, each of said carriers being provided with a normally horizontal, tiltable supporting element, a ramp member on said supporting element, a co-operating control member normally positioned adjacent the path of said ramp member, and actuating means for displacing said control member into the path of the ramp of a selected carrier for camming engagement therewith whereby said supporting element is tilted into an inclined off-normal position; said actuating means comprising a stationary electromagnet, contact means forming part of an operating circuit for said electromagnet, and selector means on each carrier presettable to operate said contact means for completing said circuit upon the movement of the carrier past said contact means.

11. The combination according to claim 10 wherein said electromagnet is provided with an armature, said control member comprising a grooved roller on said armature.

12. In a conveyor system, in combination, an endless band, a series of carriers on said band, each of said carriers being provided with a normally horizontal, tiltable supporting element, a work station alongside said band provided with an inclined receiving surface, mechanism at said work station actuatable for tilting said supporting element into substantial alignment with said receiving surface, and detent means on said supporting element normally projecting from its upper surface for preventing the sliding of an article off said upper surface onto said receiving surface in the tilted position of said supporting element; said detent means including a depending lever swingable in a plane parallel to the direction of advance of said band, an upward extension on said lever retractable below said upper surface by a swinging of said lever, and a stationary abutment for said lever at said work station, said lever clearing said abutment in the horizontal position of said supporting element but being swingable thereby into a detent-retracting position in the tilted state of the supporting element.

13. The combination according to claim 12 wherein said mechanism includes a ramp member on said supporting element, a co-operating control member at said work station, electromagnetic means selectively operable to place said control member in the path of said ramp member for camming engagement therewith, and operating means for said electromagnetic means including stationary contact means and selector means on said carrier engageable with said contact means.

14. In a conveyor system, in combination, an endless band, a plurality of work stations positioned on both sides of said band, each of said work stations being provided with an inclined receiving surface, a series of carriers on said band each provided with two normally horizontal supporting elements respectively tiltable toward substantial alignment with receiving surfaces on opposite sides of the band, and mechanism at each work station selectively actuatable for tilting either supporting element of any carrier; said mechanism including a ramp member on each supporting element, a co-operating control member at each work station toward whose receiving surface said supporting element is tiltable, electromagnetic means selectively operable to place said control member in the path of said ramp member for camming engagement therewith, and operating means for said electromagnetic means including stationary contact means and selector means on said carrier engageable with said contact means.

15. The combination according to claim 14 wherein said selector means comprises a pair of interconnected, identical selector devices on opposite sides of each carrier.

16. The combination according to claim 14 wherein the supporting elements of each carrier are a pair of interleaved grids.

17. The combination according to claim 14, further comprising detent means on each supporting element normally projecting from its upper surface for preventing the sliding of an article off said upper surface onto an adjacent receiving surface in the tilted position of the supporting element; said detent means including a depending lever swingable in a plane parallel to the direction of advance of said band, an upward extension on said lever retractable below said upper surface by a swinging of said lever, and a stationary abutment for said lever at each associated work station, said lever clearing said abutment in the horizontal position of said supporting element but being swingable thereby into a detent-retracting position in the tilted state of the supporting element.

18. In a conveyor system, in combination, a series of carriers, conveyor means defining a path for said carriers, each of said carriers being provided with a normally horizontal, tiltable supporting element, a ramp member on said supporting element, a co-operating control member normally positioned adjacent the path of said ramp member, and actuating means for displacing said control member into the path of the ramp of a selected carrier for camming engagement therewith whereby said supporting element is tilted into an inclined off-normal position; said actuating means comprising a stationary electro-magnet, contact means forming part of an operating circuit for said electromagnet, and selector means on each carrier presettable to operate said contact means for completing said circuit upon the movement of the carrier past said contact means.

References Cited in the file of this patent
UNITED STATES PATENTS

| | | |
|---|---|---|
| 1,911,525 | Neuman | May 30, 1933 |
| 2,615,424 | Spickler | Oct. 28, 1952 |
| 2,667,260 | Pyles | Jan. 26, 1954 |

FOREIGN PATENTS

| | | |
|---|---|---|
| 51,408 | Sweden | Apr. 12, 1922 |